United States Patent
Im et al.

(10) Patent No.: US 8,521,946 B2
(45) Date of Patent: Aug. 27, 2013

(54) SEMICONDUCTOR DISK DEVICES AND RELATED METHODS OF RANDOMLY ACCESSING DATA

(75) Inventors: Kwang-Seok Im, Seoul (KR); Bum-Seok Yu, Gyeonggi-do (KR); Yang-sup Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1052 days.

(21) Appl. No.: 12/338,527

(22) Filed: Dec. 18, 2008

(65) Prior Publication Data

US 2010/0082882 A1    Apr. 1, 2010

(30) Foreign Application Priority Data

Sep. 26, 2008  (KR) .................. 10-2008-0094785

(51) Int. Cl.
*G06F 12/00* (2006.01)
(52) U.S. Cl.
USPC ...................... 711/103; 711/154; 711/170
(58) Field of Classification Search
USPC ........................... 711/103, 154, 170
See application file for complete search history.

(56) References Cited

U.S. PATENT DOCUMENTS

| | | | |
|---|---|---|---|
| 5,394,537 A * | 2/1995 | Courts et al. | 711/202 |
| 7,032,088 B2 * | 4/2006 | Paladini et al. | 711/158 |
| 7,212,426 B2 | 5/2007 | Park et al | |
| 7,266,690 B2 * | 9/2007 | Field | 713/165 |
| 7,293,173 B2 * | 11/2007 | Field | 713/165 |
| 7,330,970 B1 * | 2/2008 | Field | 713/165 |
| 7,802,066 B2 * | 9/2010 | Paladini et al. | 711/158 |
| 7,853,760 B2 * | 12/2010 | Paladini et al. | 711/158 |
| 2005/0033934 A1 * | 2/2005 | Paladini et al. | 711/170 |
| 2005/0262341 A1 * | 11/2005 | Field | 713/165 |
| 2005/0262342 A1 * | 11/2005 | Field | 713/165 |
| 2006/0123215 A1 * | 6/2006 | Paladini et al. | 711/170 |
| 2008/0005522 A1 * | 1/2008 | Paladini et al. | 711/170 |

FOREIGN PATENT DOCUMENTS

| | | |
|---|---|---|
| JP | 2005-196764 A | 7/2005 |
| JP | 2006-277737 A | 10/2006 |
| JP | 2007-164355 A | 6/2007 |
| KR | 10-0528482 B1 | 7/2005 |

OTHER PUBLICATIONS

"random-access memory", Computer Dictionary Online, Dec. 5, 1995, p. 1.*
"flash erasable programmable read-only memory", Computer Dictionary Online, Apr. 22, 1995, p. 1.*

* cited by examiner

*Primary Examiner* — Matthew Bradley
(74) *Attorney, Agent, or Firm* — Myers Bigel Sibley & Sajovec, P.A.

(57) ABSTRACT

A computing system includes a host, a data source device, and a controller. The controller is configured to respond to a random access command from the host by setting information in a register that selects what data is to be accessed in the data source device. The controller then successively accesses the data in the data source device using the information that was set in the register.

6 Claims, 9 Drawing Sheets

SEMICONDUCTOR DISK DEVICES AND RELATED METHODS OF RANDOMLY ACCESSING DATA

CROSS-REFERENCE TO RELATED APPLICATION

This U.S. non-provisional patent application claims priority under 35 U.S.C. §119 of Korean Patent Application No. 10-2008-0094785 filed on Sep. 26, 2008, the entire contents of which are incorporated herein by reference.

BACKGROUND

The present invention disclosed herein relates to electronic devices and, more particularly, semiconductor disk devices and related methods for randomly accessing data.

There is an ever-increasing demand for higher data storage capacities and densities in digital data storage units (devices). Among many kinds of information storage units, hard disk drives (HDDs) are widely used in digital processing systems because of their high recording data density, high data transmission rate, fast data read/write access, and low cost. A HDD includes a data storage disc, a head that reads and writes data on the disc, and a movable arm that positions the head relative to the disc. The disc functions as a nonvolatile storage medium for storing data, and can be formed from aluminum sheets coated with a magnetic substance. Those aluminum sheets can be referred to as a "platter".

The HDD is a mechanical device that spins the disc and positions the head relative to the disk to carry out read and write operations. The basic structure and operational function of HDDs have been around since at least 1973 when the Winchester HDD (or non-removable disk drive) was introduced. For some digital data storage applications, the mechanical structure of the HDD has been supplemented and/or replaced by other kinds of data storage devices, such as nonvolatile random access memories (RAM). Some potential disadvantages of HDDs is that their mechanical operation makes their operation vulnerable to vibration, impact, air density, and mechanical wear/fatigue.

More recently, semiconductor disk devices, also called solid state disks (SSDs), have been introduced that employ flash memory architectures to store digital data. The commercial demand for SSDs has been rapidly increasing as they are increasingly used instead of HDDs in some applications. Compared to HDDs, SSDs do not yet provide a cost-effective alternative to HDDs for high data storage capacity requirements. However, with continuing advancements in SSD technologies, it is envisioned that SSDs will continue to replace HDDs for an increasing number of applications.

SUMMARY

Some embodiments of the present invention are directed to a data processing method for randomly accessing memory of a semiconductor disk device. In response to a random access command, information is set in a register to select data that is to be accessed. A determination is made as to whether the random access command corresponds to a first random access type or to a second random access type that is different than the first random access type. In response to the random access command corresponding to the first random access type, data is accessed in a first unit of a first memory of the semiconductor disk device to provide an access result which is then partly masked using the information that was set in the register. In response to the random access command corresponding to the second random access type, a random access operation is successively conducting in a second unit of the first memory, which is smaller than the first unit, using the information that was set in the register.

In some further embodiments, the first unit of the first memory of the semiconductor disk device defines a page, and the second unit of the first memory of the semiconductor disk device defines a sector.

In some further embodiments, the accessed result is partially masked by accessing the data in the first unit of the first memory to provide the accessed result, at least partly masking the accessed result using the information that was set in the register, and storing a result of the masking into a second memory.

In some further embodiments, the random access operation is successively carried out in the second unit by successively generating addresses of the first memory to be randomly accessed using the information that was set in the register, successively generating addresses of a second memory that is to store a result of the random access of the first memory, randomly accessing the data of the first memory successively using the generated addresses of the first memory, and storing a result of the successive random accesses into the second memory using the generated addresses of the second memory.

In some other embodiments, a data processing method for randomly accessing memory of a semiconductor disk device includes responding to a random access command by setting information in a register to select data that is to be accessed. Data from a first memory of the semiconductor disk device is accessed in response to the random access command. A result of the accessed data is at least partially masked using the information that was set in the register. A result of the masking is stored into a second memory.

In some other embodiments, a data processing method for randomly accessing memory of a semiconductor disk device includes responding to a random access command by setting information in a register to select data that is to be accessed. Addresses of a first memory of the semiconductor disk drive that are to be accessed using the information that was set in the register are successively generated. Addresses of a second memory of the semiconductor disk drive that will be used to store a result of accesses of the first memory that use the generated addresses of the first memory are successively generated. Accesses of the data from the first memory that successively correspond to the generated addresses of the first memory are carried out. The result of the accesses of the first memory that use the generated addresses of the first memory is stored into the second memory using the generated addresses of the second memory.

In some other embodiments, a semiconductor disk drive includes a flash memory and a controller. The flash memory is electrically connected to at least one channel. The controller is configured to respond to a random access command by setting information in a register that selects what data is to be accessed in a flash memory, and by successively accessing the data through a plurality of accesses using the information that was set in the register.

In some further embodiments, the controller includes a buffer memory and a random-access control unit. The buffer memory is configured to store a result of the successive accesses of the flash memory. The random-access control unit is configured to set the information in the register in response to the random access command, to generate a plurality of addresses of the flash memory that are to be successively accessed using the information that was set in the register, and to generate a plurality of addresses of the buffer memory that will be used to store the result of the successive accesses of the flash memory.

In some further embodiments, the random-access control unit is configured to respond to the random access command by generating an address pointer to the flash memory and to the buffer memory which is to be accessed next in the sequence of successively accesses of the flash memory.

In some further embodiments, the random-access control unit resides in a flash translation layer.

In some further embodiments, the controller further includes a buffer memory control unit that is configured to control an access operation that is directed to the buffer memory. The buffer memory control unit at least partly masks data from a first unit of the flash memory that is accessed by the random-access control unit.

In some further embodiments, the masking is carried out using the information that was set in the register.

In some further embodiments, the buffer memory control unit includes a DQ input/output masking circuit that is configured to carry out the masking.

In some other embodiments, computing system includes a host, a data source device, and a controller. The controller is configured to respond to a random access command from the host by setting information in a register that selects what data is to be accessed in the data source device. The controller then successively accesses the data in the data source device using the information that was set in the register.

Some other embodiments of the present invention are directed to a random data processing method of a semiconductor disk device, that includes: setting information for selecting data to be randomly accessed, at a register in response to a random access command; selecting one from first and second random access types; accessing data in a first unit and partly making an accessed result of the first unit with reference to a result of the setting if the first random access operation is selected; and successively conducting a random access operation in a second unit smaller than the first unit with reference to the result of the setting if the second random access operation is selected.

The first unit may be a page and the second unit may be a sector.

Partly masking the accessed result of the first unit may include: accessing the data of the first unit from a first memory in response to the random access command; at least partly masking the accessed result with reference to the result of the setting; and storing a result of the masking into a second memory.

Successively conducting the random access operation in the second unit may include: successively generating addresses of a first memory to be randomly accessed in response to the result of the setting; successively generating addresses of a second memory that is to store a result of the random access from the first memory; randomly accessing the data from the first memory successively in correspondence with the addresses of the first memory; and storing a result of the successive random access into the second memory in response to the addresses of the second memory.

Some other embodiments of the present invention are directed to a random data processing method of a semiconductor disk device that includes: setting information for selecting data to be randomly accessed, at a register in response to a random access command; accessing data from a first memory in response to the random access command; at least partly masking a result of the accessing with reference to a result of the setting; and storing a result of the masking in a second memory.

Some other embodiments of the present invention are directed to a random data processing method of a semiconductor disk device that includes: setting information for selecting data to be randomly accessed, at a register in response to a random access command; successively generating addresses of a first memory to be randomly accessed in response to a result of the setting; successively generating addresses of a second memory that is to store a result of the random access from the first memory; randomly accessing data from the first memory successively in correspondence with the addresses of the first memory; and storing a result of the successive random access into the second memory in response to the addresses of the second memory.

Some other embodiments of the present invention are directed to a semiconductor disk device that includes: a flash memory electrically connected to at least one channel; and a controller setting information for selecting data to be randomly accessed, at a register in response to a random access command and randomly accessing the data successively with reference to a result of the setting.

The controller may include: a buffer memory storing a result of the random access; and a random-access control unit setting the information at the register in response to the random access command, generating addresses of the flash memory to be processed by the successive random access with reference to the result of the setting, and generating addresses of the buffer memory for storing a result of the random access.

An address pointer of the flash memory and the buffer memory, which is generated for the random access, may be an address pointer to be randomly accessed next.

The random-access control unit may be formed in a flash translation layer.

The controller may further include a buffer memory control unit controlling an access operation of the buffer memory. The buffer memory control unit at least partly masks data of a first unit, which is accessed from the flash memory, in response to the random-access control unit.

The masking may be carried out with reference to the result of the setting of the register.

The buffer memory control unit may include a DQM circuit to conduct the masking.

One-time execution of a random access command may make it possible to randomly access pluralities of data stored in plural locations. Hence, it may raise access efficiency of random data in semiconductor disk devices.

Some other embodiments of the present invention are directed to a computing system that includes: a host; a data storage device; and a controller controlling the data storage device at the request of the host, wherein the controller sets information for selecting data to be randomly accessed at a register in response to a random access command, and randomly accesses the data successively with reference to a result of the setting.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified. In the figures.

DETAILED DESCRIPTION OF EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses sizes of layers and regions are exaggerated for clarity. Like reference numerals in the drawings denote like elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
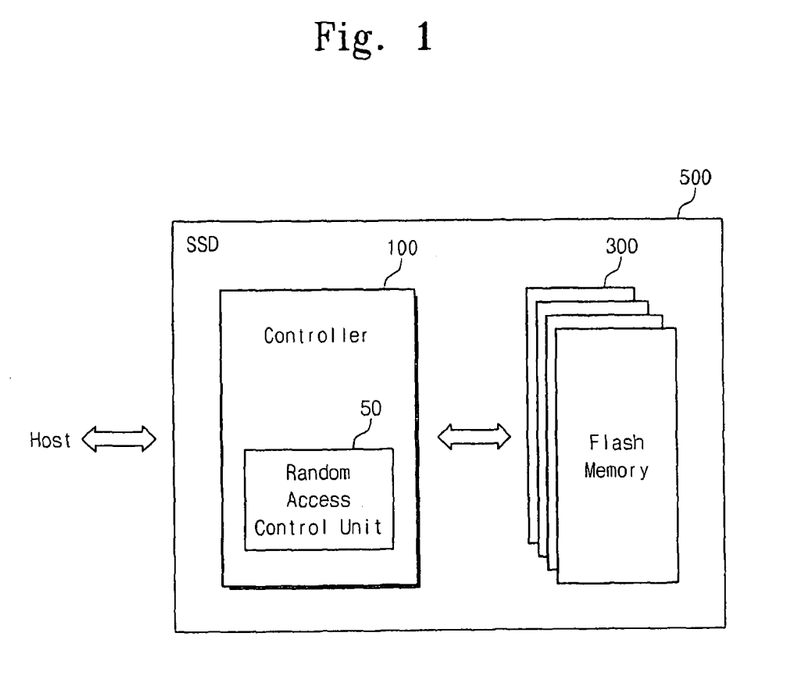
FIG. 1 is a block diagram showing a schematic structure of a semiconductor disk device according to some embodiments of the present invention.

FIG. 1 is a block diagram showing a schematic structure of a semiconductor disk device in accordance with some embodiments of the present invention.

Referring to FIG. 1, the semiconductor disk device 500 may include a controller 100 and a data storage device 300. The data storage device 300 includes a plurality of semiconductor memories that are configured to provide a data storage medium for the semiconductor disk device 500. Accordingly, in contrast to a HDD which stores data on a rotatable disk, the data storage device 300 stores data in semiconductor memory chips. The data storage device 300 may include one or more nonvolatile memory devices, such a flash memory devices. For example, the data storage device 300 may include a plurality of flash memory device chips that are read/write accessible to the controller 100 through a pluralities of channels (e.g., a number N).

Although exemplary embodiments of the present invention are described in the context of the data storage device 300 including flash memory devices, the present invention is not limited thereto because the other types of semiconductor nonvolatile memory devices may be used in the data storage device 300. Some exemplary types of nonvolatile memory devices that may be used in the data storage device 300 can include, but are not limited to, magnetic RAM (MRAM) devices, phase-change RAM (PRAM) devices, and other types of nonvolatile memory devices.

When the data storage device 300 includes flash memory devices, the flash memory cells can be formed in various different patterns to provide differing data storage characteristics. For example, the flash memory may include single-level flash memory cells each storing 1-bit data, or multi-level flash memory cells each storing multi-bit data. The flash memory may have a hybrid configured that uses both single-level flash memory cells and multi-level flash memory cells.

The basic structure of the individual flash memory cells can be varied. Exemplarily, memory cells that can be included in the flash memory may have a NAND string structure, or may have a NOR string structure. NAND type flash memory cells having a NAND string structure may form a NAND type flash memory, or an One-NAND (a memory core and a control logic block are integrated on a single chip) type flash memory. NOR type flash memory cells having a NOR structure may form a NOR type flash memory.

The structure of charge storage layer of the flash memory cells may be varied. For example, a charge storage layer of the flash memory cell may be made from a conductive polycrystalline silicon layer or from an insulation layer such as Si3N4, Al2O3, HfAlO, or HfSiO. A flash memory using the insulation layer as the charge storage layer may be called as "a charge trap flash (CTF) memory".

The controller 100 is configured to exchange data with a host through one or more interface protocols such as, for example, universal serial bus (USB), multimedia card (MMC) interface, peripheral component interconnection express (PCI-E) interface, serial advanced technology attachment (SATA), parallel ATA, small computer system interface (SCSI), serial attached SCSI (SAS), enhanced small disk interface (ESDI), and/or integrated drive electronics (IDE).

The controller 100 operates to control operations for reading/writing data into/from the flash memory in response to an input command from the host. The controller 100 includes a random-access control unit 50 for controlling random data access between a buffer and the flash memory. The random-access control unit 50 may be configured in hardware, software, or firmware. In this description, the random-access control unit 50 is described in the context of being included in a flash translation layer (FTL), however the invention is not restricted thereto. The random-access control unit 50 may be separate from and operated by the FTL.

Various random access operation are carried out by adapting the data masking operations and/or the sector bit mapping operations in response to a user's selection in accordance with some embodiments of the present invention. As will be described herein, the random access operation of some embodiments makes it possible to randomly access plural data that are stored in pluralities of locations using a single random access command. Such operation may thereby reduce firmware overhead and data access time, and may increase random data access efficiency of the semiconductor disk device. Since the random access operation can be performed by components that are within the controller 100, such within the FTL or registers, it may be unnecessary to add other components to carry out such operation.

Figure 2:
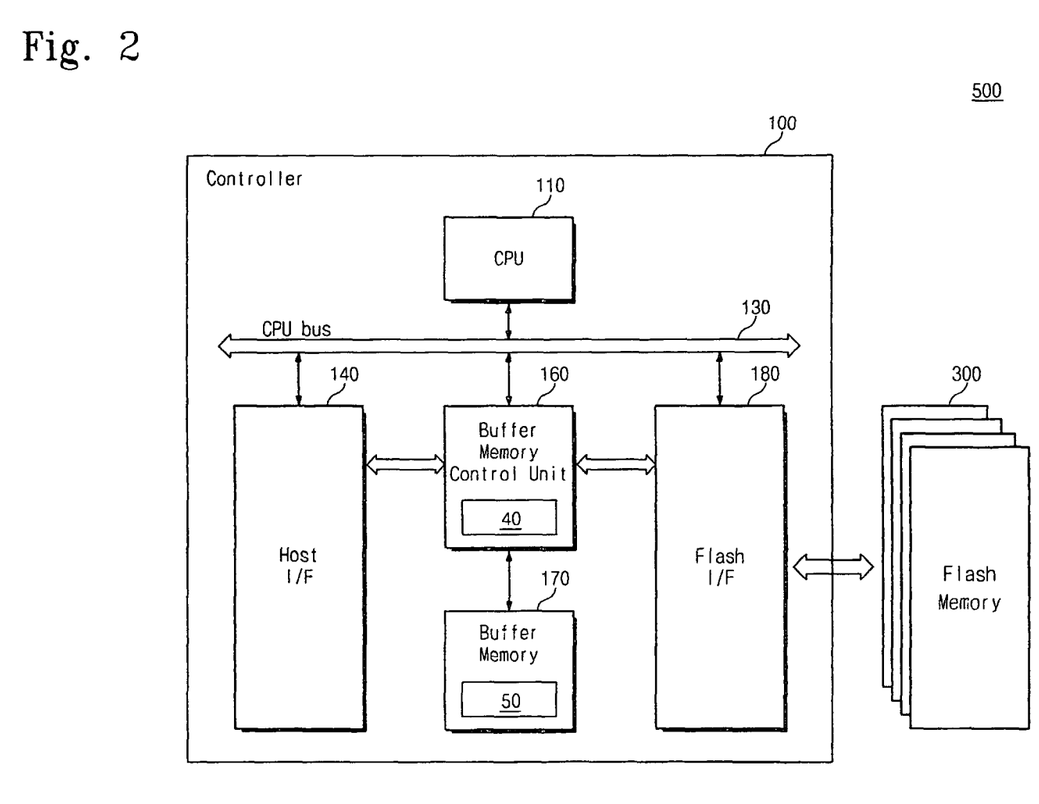
FIG. 2 is a block diagram showing a concrete structure of the controller shown in FIG. 1 according to some embodiments of the present invention.

FIG. 2 is a block diagram showing a detailed structure of the controller 100 shown in FIG. 1.

Referring to FIG. 2, the controller 100 includes a central processing unit (CPU) 110, a CPU bus 130, a host interface 140, a buffer memory control unit 160, a buffer memory 170, and a flash interface 180. The CPU 110, the host interface 140, a buffer memory control unit 160, the buffer memory 170, and the flash interface 180 are connected to each other by way of the CPU bus 130.

The CPU 110 controls general operations of the semiconductor disk device 100. The host interface 140 exchanges commands, addresses, and data with the host under control of the CPU 110. Data that is received from the host or that is to be transferred to the host is temporarily stored in the buffer memory 170 and respectively transferred to the flash memory or the host. The buffer memory control unit 160 operates to control access operations (e.g., reading, writing, and erasing operations) to the buffer memory 170 under control of the CPU 110. The buffer memory control unit 160 includes a masking unit 40 that is configured to selectively mask (i.e., to selectively not transfer) a part of the data to/from a flash memory of the data storage device 300. The masking unit 40 may include a DQM circuit (DQ input/output masking circuit). For a data masking operation, the masking unit 40 may include a circuit that generates a masking clock signal, responsive to a data value that is set in a register, and a counter that generates a sector address for the buffer memory 170 which is to be masked or excluded from the masking. The data masking operation of the masking unit 40 may be performed under control of the random-access control unit 50.

The buffer memory 170 is configured to temporarily store data that is being transferred between the flash memory and the host, and is configured to store software necessary for managing the FTL and programs to be managed by the CPU 110. The buffer memory 170 also stores supplemental information processed by the FTL. e.g., address mapping information of the flash memory. The FTL operates as the random-access control unit 50 for controlling random access to memory locations in the flash memory, and coarse with some embodiments of the present invention. Various functions that can be carried out by the FTL will be described in further detail below.

The buffer memory 170 may be implemented in a volatile memory (e.g., SRAM or DRAM) having storage capacity corresponding to a size of a page or plural pages of the flash memory. Supplemental information, such as address mapping information, can be stored in a defined area (e.g., meta data area) of the flash memory. Address mapping information stored in the flash memory or in another corresponding data storage area may be loaded into the buffer memory 170 in response to power-up of the controller 100. Software that is used for executing FTL functions may be also stored in the flash memory or in another corresponding data storage area (e.g., boot code area) and loaded into the buffer memory 170 in response to power-up of the controller 100.

The flash memory of the data storage device 300 can be configured so that an erase operation is performed before data can be written to a corresponding memory cells, and its data erase unit is greater than its data write unit. These characteristics may make it difficult to use the flash memory as a main memory, and may also make the data source device 300 difficult to use with a general hard-disk file system even when the flash memory is used as an auxiliary memory. Thus, a flash translation layer (FTL) is used between a file system (not shown, generally the file system is stored in the host in a form of software) and the flash memory so that the necessary flash memory erase operations are hidden from the file system.

The FTL can perform functions such as management of logical address-to-physical address mapping information, management of bad blocks, management of data protection against unexpected power interruption, and/or wear leveling. In accordance with some embodiments, the FTL also functions as the random-access control unit 50, by controlling the random data access to the flash memory in response to a random access command input from the host.

A random access operation may be divided into a data masking type random access operation and a sector bitmap type random access operation. In the data masking type random access operation, the FTL selectively masks a part of data (masks memory cells), which is accessed from the flash memory, by controlling the masking unit 40 included in the buffer memory control unit 160. As a result, a plurality of random data are selectively provided to the buffer memory 170 in response to a single random access command.

In the sector bitmap type random access operation, the FTL automatically generates addresses of sectors that are to be accessed based on values that are set in the register. In accordance with some embodiments of the present invention, a plurality of addresses for plural of different data are successively generated in response to a single random access command. The number of sectors that are be accessed may be defined in the register. The random data access may be carried out only to a specific sector that is designated by a result set in the register. Thus, it makes it possible to accomplish optimized random data access without consuming channels. The sector bitmap type random access operation can be bidirectionally enabled between the flash memory and the buffer memory 170, which can be even applicable to a modified copy-back operation.

The flash interface 180 exchanges data through plural channels with the flash memories of the storage device 300. Each channel may be electrically connected to the plural flash memories. For example, one channel may be connected to the same kind of flash memories, while another channel may be connected to another kind or the same kind of flash memories. The flash memories that are connected to each channel may include at least one of NOR flash memory, NAND flash memory, one-NAND flash memory, single-level cell (SLC) flash memory, multi-level cell (MLC) flash memory, and/or other types of memories.

The flash interface 180 includes a register (not shown) that may be used to designate data that is to be randomly accessed from the flash memory. The function of designating a register for data to be randomly accessed can be controlled by the FTL operating as the random-access control unit 50. A register (not shown) included in the buffer memory control unit 160 also may be used in the random access operation.

Figure 3:
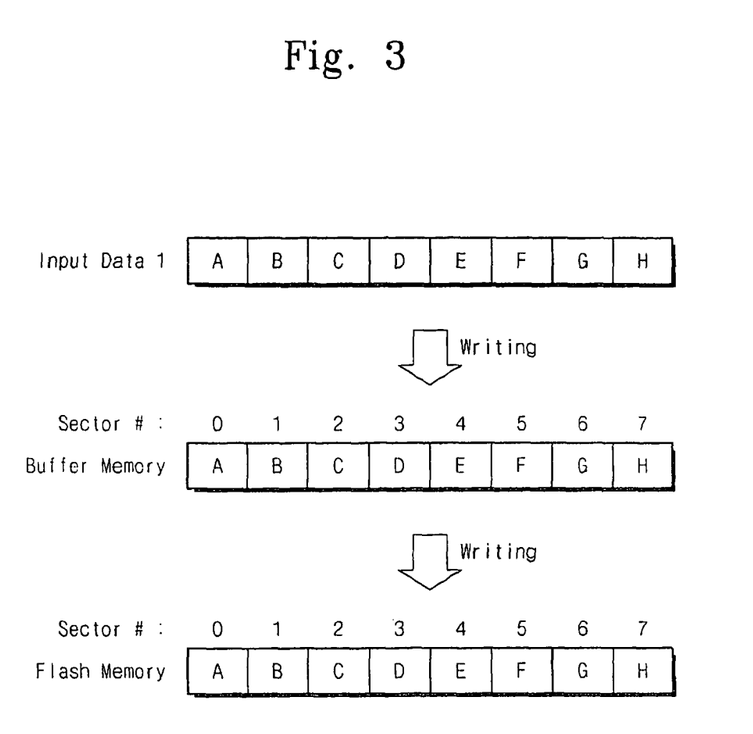
FIG. 3 is a diagram illustrating data storage patterns of the buffer and flash memories shown in FIG. 2 according to some embodiments of the present invention.

FIG. 3 is a diagram illustrating data storage patterns of the buffer memory 170 and the flash memory shown in FIG. 2. In FIG. 3, input data (Input Data 1) may correspond to one page, and one page may include eight sectors. The page structure shown in FIG. 3 is an exemplary non-limiting embodiment of the present invention.

Referring to FIG. 3, input data (Input Data 1) is received from external to the semiconductor disk device 500 is first temporarily stored in the buffer memory 170 and is then stored to the flash memory of the data source device 300. In this case, the input data (Input Data 1), data stored in the buffer memory 170, and data stored in the flash memory are the same data having the same values. After storing data to the flash memory, the buffer memory 170 enters a state where it can then receive other input data.

Figure 4:
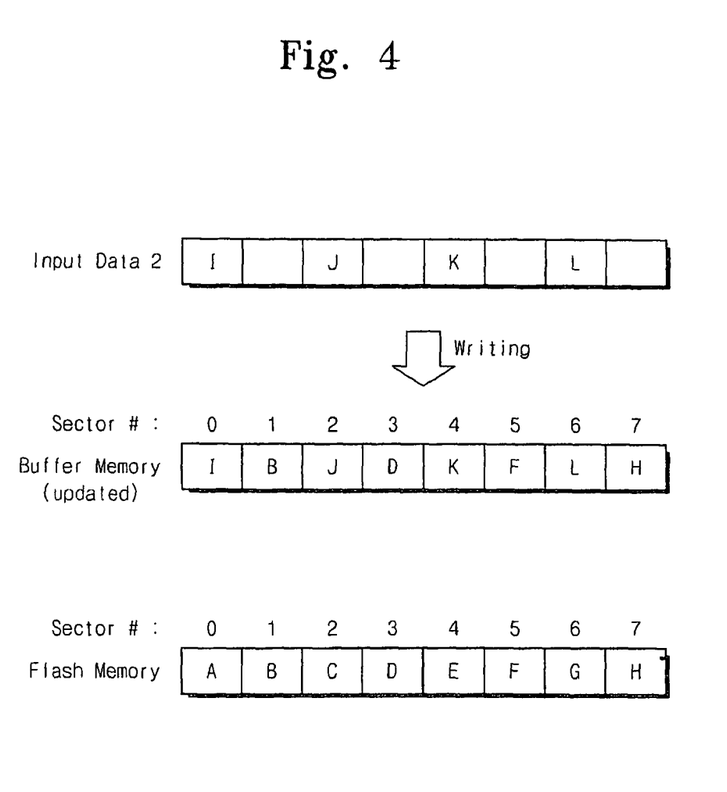
FIG. 4 is a diagram exemplarily illustrating an updating operation of the buffer memory shown in FIG. 3 according to some embodiments of the present invention.

FIG. 4 is a diagram exemplarily illustrating an updating operation in the buffer memory 170 after the storing operation of FIG. 3.

Referring to FIG. 4, the sectors of the buffer memory 170, e.g., the sectors 1, 2, 4, and 6, may be updated by new input data (Input Data 2). Because the buffer memory 170 is formed from an SRAM or DRAM, it is able to update or overwrite the buffer memory 170 by another input data anytime without an additional erasing operation.

In FIG. 4, the updated data (Input Data 2) that is to be updated in the buffer memory 170 is insufficient to form one page, which is a writing unit of the flash memory. Consequently, the updated data (Input Data 2) of the buffer memory 170 may be stored only in the buffer memory 170, not in the flash memory. Thus, the data value in the flash memory is maintained the same as was shown in FIG. 3.

Figure 5:
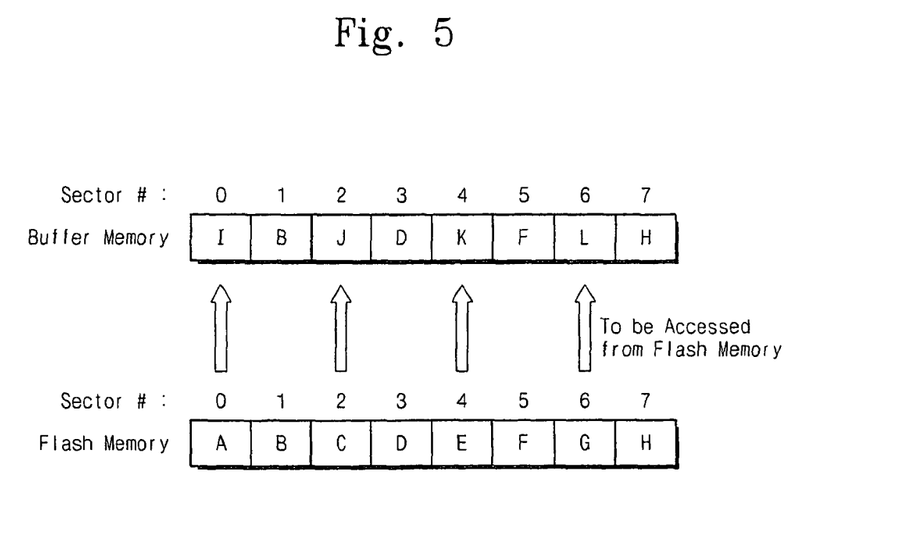
FIG. 5 is a diagram illustrating a feature of random access request by a host according to some embodiments of the present invention.

FIG. 5 is a diagram illustrating various operations of a random access request from the host.

When the host requests data, the requested data is accessed from the flash memory of the data storage device 300 and is stored in the buffer memory 170. Then, the data stored in the buffer memory 170 is provided to the host. If the data that is requested by the host is wholly present in the buffer memory 170, the requested data may be provided directly to the host from the buffer memory 170. Otherwise, if the data that is requested by the host is only partly present in the buffer memory 170, the rest of the requested data should be retrieved from the flash memory (e.g., sectionally or randomly).

FIG. 4 shows data stored in the buffer memory 170 after the updating, and FIG. 3 shows data stored in the buffer memory 170 just before the updating. Now it is assumed that after updating a part of data in the buffer memory 170, a request for data is received that requests the data corresponding to just before the updating. In this case, the buffer memory 170 is storing only a part (e.g., data of the sectors 1, 3, 5, and 7 of the buffer memory 170) of the data (i.e., the previous data just before the updating) requested by the host as shown in FIGS. 4 and 5. Thus, the rest of the requested data, which is out of the buffer memory 170 (e.g., data corresponding to the sectors 0, 2, 4, and 6 of the buffer memory 170), needs to be accessed from the flash memory. From FIG. 5, the configuration of the sectors that are needed to access data from the flash memory is exemplarily shown and it is permissible to access variant data from various positions of the sectors in response to a request by the host.

Figure 6:
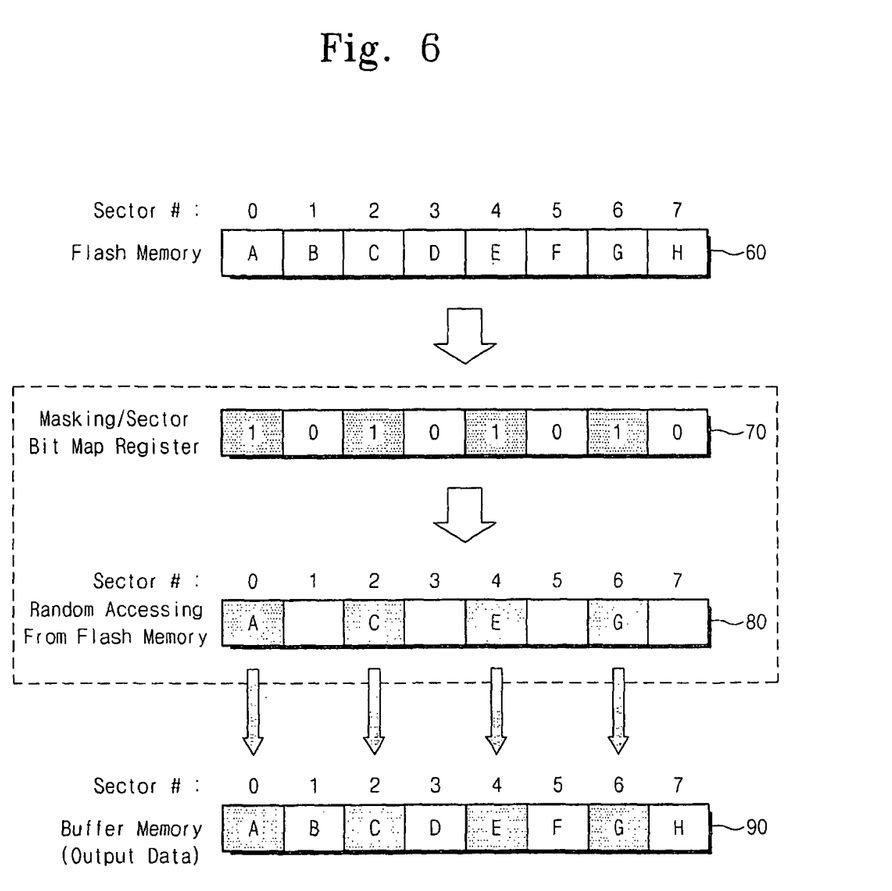
FIG. 6 is a diagram illustrating a data flow in the random access operation according to some embodiments of the present invention.
Figure 7:
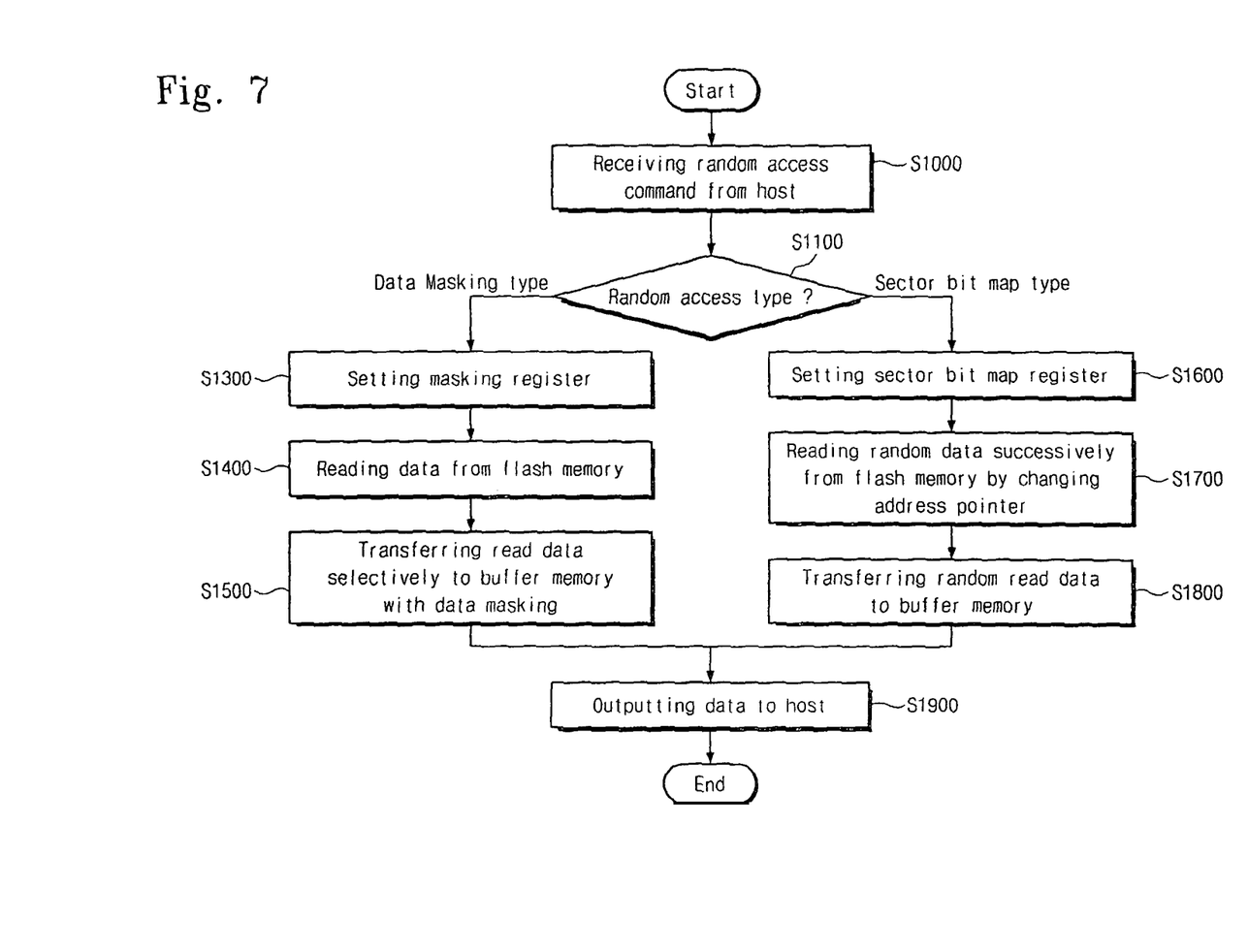
FIG. 7 is a flowchart illustrating a random access method of a flash memory according to some embodiments of the present invention.

FIG. 6 is a diagram that illustrates a data flow through the random access operation, and FIG. 7 is a flowchart that illustrates methods for randomly accessing data in the flash memory according to some embodiments of the present invention.

Referring to FIGS. 6 and 7, a random access command is received from the host (S1000), and a determination is made as to a type of the random access operation between the flash memory and the buffer memory 170 (S1100). For example, the determination they distinguish between two different types of random access operation, such as between a masking type random access operation and a sector bitmap type random access operation.

When the random access operation is determined to be the data masking type in S1100, the procedure goes to S1300. At block S3100, it sets sector positions of data, which are to be accessed, on a register in response to the received random access command. In this description, the register to be used for data masking is referred to as "a masking register". The masking register may be included in the buffer memory control unit 160, the flash interface 180, and so on.

When data that is read from the flash memory corresponds to one page and the page corresponds to eight sectors, the masking register may store 8 bits of data value corresponding to the eight sectors. A bit value of the masking register, corresponding to a sector from which data is fetched from the flash memory, may be set to "1" (or "0"). Also, a bit value of the masking register, corresponding to a sector to be masked, among data read from the flash memory, may be set to "0" (or "1"). An example of setting the register for masking data read from the flash memory is shown by the reference numeral 70 of FIG. 6. A setting result of the masking register will be used as information for selecting data to be accessed randomly, among data read from the flash memory.

After setting the register, data requested by the host is read from the flash memory (S1400). The read data that is read in operation S1400 is shown by the reference numeral 60 in FIG. 6, which may correspond to one page. The read data 60 is provided to the buffer memory control unit 160 through the flash interface 180. The masking unit 40 of the buffer memory control unit 160 selectively provides the buffer memory 170 with a part of data from the flash memory, in response to the set value 70 of the register (S1500). The selectively provided data corresponds to a masking result of the masking unit 40. The data selectively provided to the buffer memory 170 in operation S1500 is as shown by the reference numeral 80 of FIG. 6. If the read data 60 corresponds to one page, the data that is selectively provided to the buffer memory 170 is smaller than or equal to one page. The selectively provided data 80 is updated in the buffer memory 170. Next, the data stored in the buffer memory 170 is transferred to the host as output data (S1900). The output data provided to the host from the buffer memory 170 in the S1900 is as shown by the reference numeral 90 in FIG. 6.

Meantime, when the type of the random access operation is determined to be the sector bitmap type in S1100, the procedure goes to S1600. In operation S1600, a sector position of data that is to be accessed is set to a register in response to the received random access command. In this description, the register that is to be used in the sector bitmap type random access operation is referred to as "a sector bitmap register". The sector bitmap register may be included in the buffer memory control unit 160 or the flash interface 180.

A bit value of the sector bitmap register, corresponding to a sector from which data is randomly accessed from the flash memory, may be set to "1" (or "0"). Also, a bit value of the sector bitmap register, corresponding to a sector where data is not randomly accessed from the flash memory, may be set to "0" (or "1"). An example of setting the sector bitmap register for conducting the random access operation may be shown by the reference numeral 70 of FIG. 6. A setting result of the sector bit map register is used as information for selecting data to be randomly accessed from the flash memory.

Figure 8:
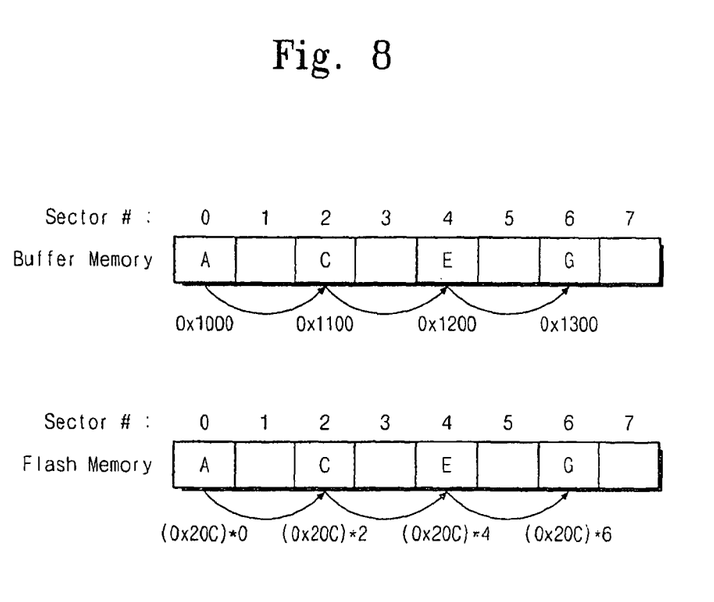
FIG. 8 is a diagram illustrating address structures of the buffer and flash memories for conducting sector bit map type random access shown in FIG. 7 according to some embodiments of the present invention.

Each bit value of the sector bitmap register, which is set in operation S1600, is used in generating an address for a sector to which the random access operation is carried out. In an embodiment of the present invention, addresses for the plural sectors may be generated in response to a single random access command. Also, each address may be configured to designate the next address, which is to be accessed, through an address pointer as shown in FIG. 8. In order to successively generate addresses for sectors to be conducted in random access, internal circuitry is configured to logically carry out associated addressing operations. In some embodiments, the address operation is carried out by means of the FTL (i.e., the random-access control unit 50) stored in the buffer memory 170.

FIG. 8 is a diagram that illustrates address structures of the buffer memory 170 and the flash memory for conducting sector bitmap type random access operation such as shown in FIG. 7.

Referring to FIGS. 6 and 8, various methods will now be described for generating address patterns of the buffer memory 170 and the flash memory to which the random access operations are directed.

If the sector bitmap register is set on '10101010', data are accessed from the sectors 0, 2, 4, and 6 of the flash memory and the number of sectors to be transferred becomes 4. In this case, data are not accessed from the sectors 1, 3, 5, and 7 of the flash memory. If the buffer memory 170 is composed of an SRAM or DRAM capable of interfacing 32-bit data, the FTL (i.e., the random-access control unit 50) controls a shift of the address pointer. For example, it is able to allocate the addresses of the sector 0 of the buffer memory 170 arranged from '0x1000' to '0x107F'. The address 0x1000 is a start address of the sector 0, and the address 0x107F is an end address of the sector 0. The end address of each sector may be calculated from the start address of the same. To conduct the random access successively, the address pointer of the buffer memory 170 jumps to a start address '0x1100' corresponding to the sector 2 from the start addresses '0x1000' corresponding to the sector 0. The shift of the address pointer, which may be conducted at the sectors 0 and 2, acts on the sectors 4 and 6 in the same manner. Because the number of sectors that are to be transferred to the buffer memory 170 is 4, address pointing cycles of the buffer memory 170 are carried out 4 times in total. The shift of the address pointer may be conducted in accordance with bit information stored in the register. Sector addresses of the buffer memory 170 may be generated successively from a counter, which is included in the masking unit 40, in accordance with the shifted address pointer. The data masking operation of the masking unit 40 is carried out by the random-access control unit 50. A shift pattern of the address pointer of the buffer memory 170 can be applicable to the flash memory of some embodiments of the present invention.

If the flash memory is an 8-bit MLC flash memory, a sector may be composed of 512 bytes, and a spare region of 12 bytes may be additionally allocated to the sector. As a result, each sector of the flash memory may be allocated in the unit of 524 bytes (i.e., the unit of 524-byte column address). Thereby, when the address pointer of the buffer memory 170 jumps in the sequence of the sectors 0, 2, 4, and 6 in order, the address pointer of the flash memory jumps also in the sequence of the sectors 0, 2, 4, and 6. In this case, the start address of each sector increments by 524*2 (i.e., by (0×20C)*2).

Returning to FIG. 7, after setting bit values of the sector bitmap register in the S1600, it successively reads random data from the flash memory by shifting the address pointers of the buffer memory 170 and the flash memory (S1700). The operation of successively reading random data at block S1700 can be executed in response to a single random access command.

Random access data read in the S1700 is provided to the buffer memory 170 as a result of the random access operation. The random access result provided to the buffer memory 170 at block S1700 may be shown by the reference numeral 80 of FIG. 6. This random access result 80 provided to the buffer memory 170 is each stored or updated in its corresponding sectors of the buffer memory 170 (S1800). Then, data stored in the buffer memory 170 is output to the host as output data (S1900). The output data provided to the host from the buffer memory 170 may be shown by the reference numeral 90 of FIG. 6.

As aforementioned, the random access methods according to some embodiments of the present invention are applicable to a multi-channel SSD having pluralities of channels, without restricting the number of channels. In FIG. 7, there is shown an exemplary one of the data masking and sector bitmap type random access operations in accordance with a user's selection. However, the random access operations are not limited thereto because they may be implemented in various other forms. For example, it may be possible to design the SSD 500 to include one or both of the data masking and sector bitmap type random access operations.

Figure 9:
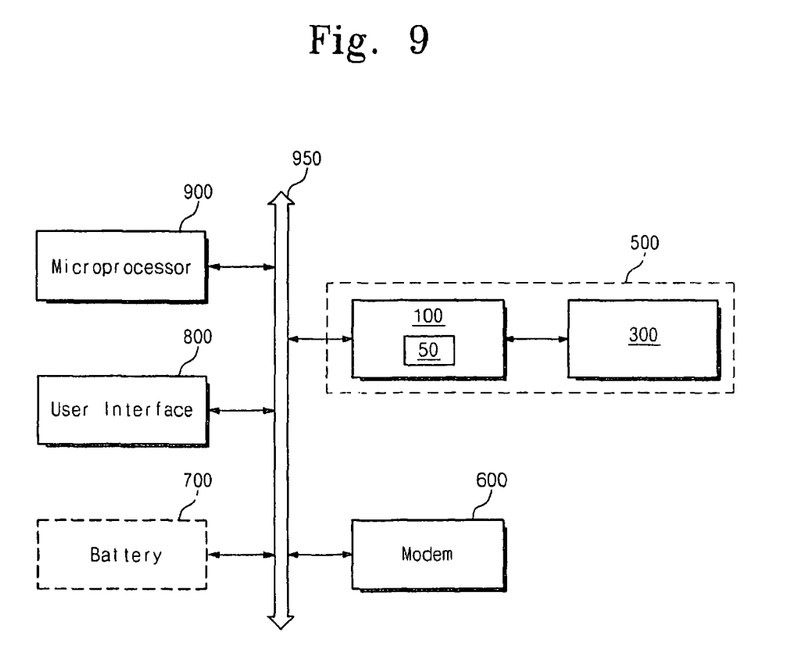
FIG. 9 is a diagram of a computing system according to some embodiments of the present invention.

FIG. 9 is a diagram of a computing system according to some embodiments of the present invention.

Referring to FIG. 9, the computing system includes the semiconductor disk controller 100, the data storage device 300, a modem 600 such as baseband chipset, a user interface 800, and a microprocessor 900, all of which may be communicatively connected to a bus 950. The controller 100 and the data storage device 300 shown in FIG. 9 may form the semiconductor disk device 500 shown in FIGS. 1 and 2. In this case, the detailed configurations of the controller 100 and the data storage device 300 can be the same as described above and, accordingly, those components are referenced by the same reference numerals and will not be further detailed.

While FIG. 9 exemplarily shows that the controller 100 and the data storage device 300 includes a semiconductor disk device (SSD), they are able to constitute a memory card and/or a memory card system as well as the SSD.

When the computing system is a mobile apparatus, the computing system may further include a battery 700 that supplies an operating voltage. Although not shown in FIG. 9, the computing system according to some embodiments the present invention may further include an application chipset, a camera image processor (CIS), a mobile DRAM, and so on. In recent years, data storage devices employing varieties of nonvolatile memories have been configured for connection to laptop computers, desktop computers, and servers. Various embodiments of the present invention may be increased proliferation of SSDs used in those and other data storage applications.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data processing method for randomly accessing memory of a semiconductor disk device, the method comprising:
   in response to a random access command, setting information in a register to select data that is to be accessed;
   determining whether the random access command corresponds to a first random access type or to a second random access type that is different than the first random access type;
   in response to the random access command corresponding to the first random access type, accessing data in a first unit of a first memory of the semiconductor disk device to provide an accessed result and partly masking the accessed result using the information that was set in the register; and
   in response to the random access command corresponding to the second random access type, successively conducting a random access operation in a second unit of the first memory, which is smaller than the first unit, using the information that was set in the register.

2. The method of claim 1, wherein the first unit of the first memory of the semiconductor disk device defines a page, and the second unit of the first memory of the semiconductor disk device defines a sector.

3. The method of claim 1, wherein partly masking the accessed result comprises:
   accessing the data in the first unit of the first memory to provide the accessed result;
   at least partly masking the accessed result using the information that was set in the register; and
   storing a result of the masking into a second memory.

4. The method of claim 1, wherein successively conducting the random access operation in the second unit comprises:
   successively generating addresses of the first memory to be randomly accessed using the information that was set in the register;
   successively generating addresses of a second memory that is to store a result of the random access of the first memory;
   randomly accessing the data of the first memory successively using the generated addresses of the first memory; and
   storing a result of the successive random accesses into the second memory using the generated addresses of the second memory.

5. A data processing method for randomly accessing a semiconductor disk device, the method comprising:
   in response to a random access command, setting information in a register to select data that is to be accessed;
   accessing data from a first memory of the semiconductor disk device in response to the random access command;
   at least partly masking a result of the accessed data using the information that was set in the register; and
   storing a result of the masking into a second memory.

6. A data processing method for randomly accessing memory of a semiconductor disk device, the method comprising:
   in response to a random access command, setting information in a register to select data that is to be accessed;
   successively generating addresses of a first memory of the semiconductor disk drive that are to be accessed using the information that was set in the register;
   successively generating addresses of a second memory of the semiconductor disk drive that will be used to store a result of accesses of the first memory that use the generated addresses of the first memory;
   accessing the data from the first memory successively corresponding to the generated addresses of the first memory; and
   storing the result, of accesses of the first memory that use the generated addresses of the first memory, into the second memory using the generated addresses of the second memory.

* * * * *